United States Patent [19]

Tsuchiya et al.

[11] 4,315,842
[45] Feb. 16, 1982

[54] HOT MELT COMPOSITION

[75] Inventors: Shozo Tsuchiya, Tokyo; Akio Oshima; Hideo Hayashi, both of Yokohama, all of Japan

[73] Assignee: Nippon Oil Company, Limited, Tokyo, Japan

[21] Appl. No.: 164,504

[22] Filed: Jul. 2, 1980

Related U.S. Application Data

[63] Continuation-in-part of Ser. No. 63,406, Aug. 3, 1979, abandoned.

[30] Foreign Application Priority Data

Aug. 9, 1978 [JP] Japan .................................. 53-96203
Sep. 14, 1978 [JP] Japan ................................. 53-113086

[51] Int. Cl.$^3$ ............................................... C08L 91/00
[52] U.S. Cl. ................................. 260/28.5 B; 525/210
[58] Field of Search .................... 525/210; 260/28.5 B

[56] References Cited

U.S. PATENT DOCUMENTS

3,322,709 5/1967 Hammer ............................... 525/210
3,600,347 8/1971 Godar, Jr. ............................ 525/210
4,010,130 3/1977 Matsuo et al. ................... 260/28.5 B Primary Examiner—Melvyn I. Marquis
Attorney, Agent, or Firm—Paul J. Sutton

[57] ABSTRACT

According to the invention there is provided a hot melt composition comprising (A) a hydrogenated resin having a softening point ranging from 60° C. to 130° C., said hydrogenated resin (A) being prepared by hydrogenating a resin at a hydrogenation percentage of aromatic rings of from 10 to 90%, said resin being prepared by copolymerizing at least two components comprising (a) 100 parts by weight of cyclopentadiene or its derivative selected from the group consisting of cyclopentadiene and dicyclopentadiene and an alkyl substituent thereof and (b) 5 to 50 parts by weight of indene or its derivative selected from the group consisting of indene and an alkyl substituent thereof and (B) one or more compound selected from the group consisting of ethylene-unsaturated ester copolymers, polyester resins and waxes.

12 Claims, 1 Drawing Figure

HOT MELT COMPOSITION

CROSS-REFERENCE TO RELATED APPLICATION

This application is a continuation-in-part of application Ser. No. 063,406 filed Aug. 3, 1979 and now abandoned.

BACKGROUND OF THE INVENTION

1. Field of the Invention

The present invention relates to a novel hot melt composition excellent in adhesive property. More particularly, it relates to a hot melt composition which is solid at ambient temperature and may be melted by heating to be applied on various materials and then solidified by cooling to adhere onto materials for serving as an adhesive or coating composition.

2. Prior Art

The commonly used matrix polymers for the hot melt compositions are polyethylene base copolymers such as ethylene-vinyl acetate copolymers and ethylene-acrylate copolymers and thermoplastic polymers such as polyethylene, polyamides, polyurethanes and polyesters, to which a variety of waxes as a viscosity adjusting agent and a tackifying resin are blended.

Natural resins such as rosin and rosin esters have been widely used as the prior art tackifying resins. Among them, rosin esters are recommended because of their excellent tackifying properties. However, such natural resins are unstable in cost and supply. For this reason, there is an increasing tendency of using petroleum resins in place of the rosin esters in recent years. However, petroleum resins have various disadvantages, particularly they are poor in tackifying and heat resistant properties. Although many proposals have been made to eliminate the disadvantages mentioned above, any petroleum resin having satisfactory properties has not yet been produced. It has been tried to hydrogenate petroleum resins for improving hues and heat resistant properties thereof. For example, those obtained by completely hydrogenating aromatic petroleum resins or cyclopentadiene base resins have been widely used. However, the tackifying properties of such resins are extremely poor. In order to improve such properties, it has been already proposed to partially hydrogenate an aromatic petroeum resin such that 5 to 80% of the aromatic components thereof are hydrogenated at the intranuclear positions, i.e. to hydrogenate the aromatic rings of the resin. (See Japanese Patent Publication No. 31899/'77) However, the tackifying properties of the thus modified resin is not satisfactorily improved so much as adapted for broad uses when compared to rosin esters of natural resources. Another proposal has been made to use a resin produced by the steps of copolymerizing a cyclopentadiene base monomer with a monovinyl substituted aromatic hydrocarbon such as styrene, α-methylstyrene or vinyltoluene and then partially hydrogenating the resultant copolymer such that 0 to 80% of the aromatic rings are hydrogenated. (See Unexamined Japanese Patent Publication No. 14059/'77) However, this prior art resin has disadvantages that the miscibility thereof with waxes is unsatisfactory and that the adhesive properties thereof to some materials including plastics is unsatisfactory. A further proposal known to the art is utilization of a hydrogenated copolymer of a cyclopentadiene base monomer and an ethylenic unsaturated ester. (See Unexamined Japanese Patent Publication No. 70450/'75) However, this known hydrogenated copolymer is disadvantageous in that it emits intensely an offensive odor when heating to melt the same with a ethylene-vinylacetate copolymer and/or a wax to prepare a hot melt composition, since a vinylacetate monomer, methylmethacrylate or the like is used as the starting material. Unexamined Japanese Patent Publication No. 132060/'75 discloses yet a further proposal wherein a hydrogenation product of a copolymer of a cyclopentadiene base monomer is copolymerized with a polar vinyl compound and a polar vinylidene compound, the amount of said polar vinyl compound being so large as 10 to 60 wt.%, resulting in insufficient miscibility with waxes. Moreover, the tackifying properties of the last mentioned product is far from satisfactory.

OBJECTS AND SUMMARY OF THE INVENTION

A principal object of the invention is to provide a novel hot melt composition which is remarkably improved in adhesive property as compared to the known hot melt compositions containing partially hydrogenated aromatic petroleum resins.

Another object of the invention is to provide a novel hot melt composition which is particularly excellent in peeling strength.

A further object of the invention is to provide a novel hot melt composition improved in transparency and hue.

A further object of the invention is to provide a novel hot melt composition which emits an odor of extremely decreased level.

A further object of the invention is to provide a novel hot melt composition which is improved in miscibility.

An additional object of the invention is to provide a novel hot melt composition of grossy appearance.

A further object of the invention is to provide a novel hot melt composition which is stable against heat.

Yet a further object of the invention is to provide a novel hot melt composition which can adhere onto a film made of plastics such as polyesters intimately with strong adhesiver power.

These and other objects of the invention will become apparent from the following description.

According to the present invention, there is provided a hot melt composition comprising:

(A) a hydrogenated resin having a softening point ranging from 60° C. to 130° C., said hydrogenated resin (A) being prepared by hydrogenating a resin at a hydrogenation percentage of aromatic rings of from 10 to 90%, said resin being prepared by copolymerizing at least two components comprising (a) 100 parts by weight of cyclopentadiene or its derivative selected from the group consisting of cyclopentadiene and dicyclopentadiene and an alkyl substituent thereof and (b) 5 to 50 parts by weight of indene or its derivative selected from the group consisting of indene and an alkyl substituent thereof; and (B) one or more compound selected from the group consisting of ethylene-unsaturated ester copolymers, polyester resins and waxes.

DESCRIPTION OF THE INVENTION

The tackifying resin used in the hot melt composition of the present invention may be produced generally in accordance with the following procedure.

100 parts by weight of a cyclopentadiene or its derivative (a) and 5 to 50 parts by weight of an indene or its derivative (b) are reacted at 200° C. to 300° C., preferably 250° C. to 280° C., for 30 minutes to 10 hours in the presence or absence of a solvent and catalyst to obtain a resin (S) having a softening point ranging from 60° C. to 130° C.

The cyclopentadiene or its derivative (a) used in this reaction may be one or more of cyclopentadiene, dicyclopentadiene, an alkyl substituted product of cyclopentadiene and dicyclopentadiene such as those prepared by substituting an alkyl group having 1 to 3 carbon atoms for its hydrogen. Although a highly pure compound is preferred, it is not essential that the compound be highly pure, and a hydrocarbon mixture containing more than 50%, particularly more than 90%, of the compound may be used. As an exemplified hydrocarbon mixture used for this purpose, there may be mentioned a concentrated fractional distillate obtained by heating to dimerize cyclopentadiene and methylcyclopentadiene to form a mixture of dicyclopentadiene, cyclopentadiene-methylcyclopentadiene codimer and as impurities cyclopentadiene-isoprene codimer and cyclopentadiene-piperylene codimer and then subjecting said mixture to distillation to ditill off the major portion of the $C_5$-fraction including $C_5$-olefins and $C_5$-paraffins.

The indene or its derivatives (b) may be one or more of indene and alkyl substituents thereof such as those prepared by substituting an alkyl group having 1 to 3 carbon atoms for its hydrogen. Other than the highly pure indene or its derivative, also preferably used is a fractional distillate containing 35% or more of indene prepared by fractional distillation of the by-product $C_9$-fraction of cracked naphtha. The fractional distillate may generally contain 20% or less of an aromatic vinyl monomer such as vinyltoluene, methylstyrene or the like.

In case where either one or both of the fractional distillates mentioned above are used, the quantities of the components (a) and (b) shall be agreed with the range specifically defined in the present invention. The greater parts of the hydrocarbons other than the components (a) and (b) contained in such distillates serve as solvents.

According to a further aspect of the invention, there is provided a ternary copolymer resin (S) having a softening point ranging from 60° C. to 130° C. by copolymerizing 100 parts by weight of said cyclopentadiene or its derivative (a) and 5 to 50 parts by weight of said indene or its derivative (b) together with 3 to 10 parts by weight of additional allyl alcohol (c) at 200° C. to 300° C., preferably 250° C. to 280° C., for 30 minutes to 10 hours in the presence or absence of a solvent. The ternary copolymer (S) added with allyl alcohol (c) shall have a hydroxyl value (millimol/100 g of resin) ranging from 30 to 120.

Irrespective of whether the resin (S) is a binary copolymer including the components (a) and (b) or a ternary copolymer further including the component (c), various kinds of inert hydrocarbon solvents may be used upon making the copolymer resin (S), the respective examples of such solvents being pentane, hexane, heptane, benzene, toluene, xylene and cyclohexane and mixtures thereof with alcohols such as ethyl alcohol and n-butanol.

Said binary copolymer (S) may be prepared by copolymerizing the components (a) and (b) by heating or alternatively by copolymerising them at 0° C. to 100° C. with the use of a Friedel-Crafts type catalyst such as boron trifluoride or aluminum chloride. However, said ternary copolymer (S) can not be prepared by the use of the Friedel-Crafts type catalyst.

When carrying out the aforementioned copolymerization reaction, the limitation concerning the quantities of respective components as defined in the present invention shall be satisfied. In detail, in the binary system, 100 parts by weight of the component (a) shall be combined with 5 to 50 parts by weight of the component (b), preferable combination being 70 to 95 parts by weight of the component (a) and 5 to 30 parts by weight of the component (b). More preferred combination is 100 parts by weight of the component (a) and 9 to 40, most preferably 15 to 30, parts by weight of the component (b). If the quantity of the component (b) is in excess of 50 parts by weight, the subsequent hydrogenation reaction will not proceed to a sufficient extent, resulting in unacceptable hue and unsatisfactory adhesive property. On the contrary, if the quantity of the component (b) is short of 5 parts by weight, the improvement in adhesive property by the addition of indene (component (b)) is not realized to result in poor adhesive strength of the final product.

In the ternary system, 3 to 10 parts, preferably 5 to 9 parts, by weight of the component (c) shall be added to the combination of the components (a) and (b) defined as above. If the quantity of the component (c) is in excess of 10 parts by weight, the miscibility of the resultant resin is deteriorated to result in poor adhesive property. On the other hand, if the quantity of the component (c) is short of 3 parts by weight, the advantageous improvement attributed to the introduction of hydroxyl group is not realized to result in unsatisfactory adhesive property, particularly poor adhesive power to polyesters. It should be appreciated from the foregoing that a hot melt composition having a satisfactory adhesive strength can be produced in accordance with the present invention so far as the mixed ratio of the components (a), (b) and (c) in the copolymerization step is controlled in the range defined as above.

In the present invention, the copolymer resin (S) prepared under the condition set forth above is subsequently hydrogenated. The hydrogenation may be effected in the presence of any of the known catalysts commonly used for hydrogenating the petroleum resins or cyclopentadiene or its derivative. The catalysts which may be used in the hydrogenation step includes the Group VIII metals such as nickel, palladium, ruthenium, rhodium, cobalt and platinum, the Group VI metals such as tungsten, chromium and molybdenum, the Group VII metals such as rhenium and manganese, and copper. Said metals may be used singly or in combination of two or more metals, and may be used directly in the activated state or carried on a solid carrier such as alumina, silica-alumina and diatomaceous earth. Although it is possible to melt the copolymer resin for subjecting to the hydrogenation step, it may be dissolved in a hydrocarbon solvent such as hexane, heptane, octane, cyclohexane, methylcyclohexane, decalin, benzene, toluene and xylene or in a mixed solvent prepared by mixing one or more of said hydrocarbon solvents with an alcohol such as ethyl alcohol and butanol prior to presentation to the hydrogenation step. The hydrogenation is effected at a temperature ranging from 0° C. to 350° C., preferably 150° C. to 300° C., under a hydrogen pressure of from an ambient pressure to 200 kg/cm$^2$G to obtain a hydrogenated resin (HS) used in the hot melt composition of the invention. At this hydrogenation step, 10 to 90%, preferably 30 to 80% and most preferably 50 to 70%, of the aromatic rings originated from the indene or its derivative admixed to copolymerize in the preceding copolymerization step shall be hydrogenated in accordance with the present invention. If the hydrogenation percentage of the aromatic rings exceeds 90%, the adhesiver power of the hot melt composition containing such hydrogenated resin becomes disadvantageously inferior whereas if the hydrogenation percentage of aromatic rings is not reached to the defined percentage of 10%, the hue of the resultant resin becomes unacceptable and the heat resistance of the resin is unsatisfactory. The hydrogenation percentage of the aromatic rings referred to throughout the specification and appended claims is determined by measuring the NMR (nuclear magnetic resonance) of protons in the resin and the hydrogenated resin to find out the decrease of the peak at about 7 ppm due to the proton in the aromatic ring and represented by the value calculated from the following equation:

$$\text{Hydrogenation Percentage of Aromatic Ring} = \left[1 - \frac{\text{Peak Area of the Hydrogenated Resin }(HS)}{\text{Peak Area of the Resin }(S)}\right] \times 100$$

wherein the peak area is the area of the peak appearing at about 7 ppm due to the proton of the aromatic ring)

The bromine value of the thus produced hydrogenated resin (HS) is generally less than 40, and preferably less than 25. If the bromine value thereof exceeds 40, the resin (HS) is deteriorated in its hue and stability against heat so that the hot melt composition containing the resin becomes colored extensively and produces undissolved materials when in use.

It is essential in the present invention that the softening point of the thus produced resin (HS) shall be ranging within 60° C. to 130° C., preferably 80° C. to 100° C. If the softening point is below 60° C., the cohesive power of the hot melt composition is lowered, thus leading to insufficient adhesive properties. Contrarily, the resin having a softening point of higher than 130° C. is disadvantageous in that the tackifying properties thereof is lowered to thus result in deteriorated adhesive property.

The hydroxyl value of the hydrogenated resin (HS) produced by hydrogenating the ternary copolymer resin (S) shall be 30 to 120, preferably 35 to 100. If the hydroxyl value is higher than the range defined above, the miscibility is deteriorated to thus lower the adhesive strength of the final product composition. As compared to the binary system, the composition containing the ternary hydrogenated resin (HS) is increased in adhesive strength, particularly improved in peeling strength. Further, as an advantageous effect resulted from the use of the ternary system copolymer, the adhesive property of the hot melt composition may be improved such that it adheres firmly to a film made of plastics such as polyesters. However, this effect becomes unappreciable if the hydroxyl value is decreased below 30.

The hot melt composition of the invention is produced by blending the hydrogenated resin (HS) made from the binary or ternary copolymer, which has been prepared by copolymerizing the cyclopentadiene or its derivative (a) and the indene or its derivative (b) optionally with the allyl alcohol at the specifically defined ratio, with one or more of the compounds (B) selected from the group consisting of ethylene-unsaturated ester copolymrs, polyester resins and waxes. Other tackifying resins such as rosin and derivatives thereof, terpentine resins or the like, and a plasticizer, antioxidant and filler may be added, as desired.

The ethylene-unsaturated ester copolymers which may be used in the composition of the invention are copolymers of ethylene with unsaturated ester having an ester group and a carbon-carbon double bond in its molecule, which may have 4 to 20 carbon atoms. Such ethylene-unsaturated ester include vinyl acetate and an ester of acrylic acid or methacrylic acid with alcohols having 2 to 4 carbon atoms. Those copolymers containing 5 to 35 mol%, preferably 10 to 25 mol% of the unsaturated ester compound and having a melt index of 0.1 to 1000 may be generally used.

The polyester resins which may be used in the composition of the invention include those made from difunctional or polyfunctional carboxylic acids having 4 to 20 carbon atoms and dihydric or polyhydric alcohols having 2 to 20 carbon atoms. The average molecular weight of such polyesters is generally 500 to 50,000, and preferably 800 to 25,000. The preferred polyester resins are those prepared from difunctional carboxylic acids mainly composed of phthalic acids such as terephthalic acid and isophthalic acid and dihydric alcohols such as glycols having 2 to 10 carbon atoms, e.g. ethylene glycol, propylene glycol and esters thereof.

Various waxes including petroleum waxes such as paraffin wax and microcrystalline wax, natural waxes, polyethylene waxes and polypropylene waxes may be selectively used depending on the applications.

As described hereinabove, the hot melt composition of the invention is produced by blending the hydrogenated resin (HS) which serves as a tackifying resin with at least one selected from the group consisting of ethylene-unsaturated ester copolymers, polyester resins and waxes. The mixing ratio may be selected in a wide range. In general, 100 parts by weight of the ethylene unsaturated ester copolymer and/or the polyester resin are mixed with 20 to 300 parts by weight of said hydrogenated resin and 0 to 500 parts, preferably 10 to 400 parts, by weight of the waxes. The polyester resin may be used in substitution for the ethylene-unsaturated ester copolymer as an equivalent to the latter compound. It is, therefore, possible to substitute the ethylene-unsaturated ester copolymer totally for the polyester resin or alternatively they may be used together in the mixed form, the common practice being the utilization of a mixture of ethylene-unsaturated ester copolymer and waxes.

Further, 0 to 5 parts by weight of a filler such as calcium carbonate, titanium oxide, talc and clay, 0 to 5 parts by weight of an antioxidant, 0 to 20 parts by weight of a plasticizer and 0 to 10 parts by weight of a pigment may be added, if necessary. When the hot melt composition is used as an adhesive for package materials made of paper, plastics film or aluminum foil, the quantity of the ethylene-unsaturated ester copolymers is decreased. On the other hand, in production of the composition used for wooden craft or the like whereat the relatively strong adhesive power is required, the composition is enriched with the ethylene-unsaturated ester copolymer or desirously composed mainly of the ethylene-unsaturated ester copolymer and said hydrogenated tackifying resin.

Some examples of the invention will be given hereinbelow in order to clarify the features and advantages of the invention. However, it should be understood that the following examples are not intended to limit the invention in any sense but to include all modifications and variations as defined in the appended claims. In the examples given blow, the softening point, hue, bromine value and hydroxyl value are determined in accordance with the methods identified just below:

Softening Point: JIS K2531-60 (Ring and Ball Test)
Hue: ASTM D-1544-58T (Gardner Color)
Bromine Value: JIS K2543-65
Hydroxyl Value: Generally in accordance with Acetic Acid Anhydride Method described in I.E.C. Anal. Ed., 17, 394 (1954)

It is noted that parts hereinbelow mean "parts by weight".

EXAMPLES OF THE INVENTION

Preparation of Copolymer Resins S-1 to S-3 Used in Examples

Dicyclopentadiene (DCPD) 90% in purity, indene and xylene were charged into a two liter volume autoclave at the ratio as set forth in Table 1 below and reacted at 260° C. for 2 hours in the nitrogen atmosphere to obtain a copolymer solution from which unreacted materials, oligomers and xylene were distilled off, whereby dicyclopentadiene copolymers S-1, S-2 and S-3 having the properties as set forth in Table 1 were prepared.

TABLE 1

| | Copolymer Resin | S-1 | S-2 | S-3 |
|---|---|---|---|---|
| Materials | DCPD (parts) | 450 | 400 | 375 |
| Charged | Indene (parts) | 50 | 100 | 125 |
| | Xylene (parts) | 700 | 600 | 500 |
| Property | Yield (%) | 86 | 83 | 80 |
| of the | Softening Point (°C.) | 105 | 103 | 101 |
| Resultant | Bromine Value | 95 | 87 | 80 |
| Polymer | Hue (Gardner) | 4 | 5 | 6 |

Preparation of Copolymer Resins S-4 to S-7 Used in Examples

Into a two liter volume autoclave, charged were dicyclopentadiene 95% in purity and a fractional distillate of cracked naphtha containing 39.5% of indene and 15% of monovinyl substituted aromatic compounds including vinyltoluene and β-methylstyrene at the ratio as set forth in Table 2 below and reacted at 260° C. for 2 hours in the nitrogen atmosphere to obtain a copolymer solution from which unreacted materials, oligomers and xylene were distilled off, whereby dicyclopentadiene copolymers S-4, S-5, S-6 and S-7 having the properties as set forth in Table 2 were prepared.

TABLE 2

| Copolymer Resin | S-4 | S-5 | S-6 | S-7 |
|---|---|---|---|---|
| Dicyclopentadiene (parts) | 800 | 700 | 600 | 520 |
| Fractional Distillate Containing Indene (parts) | 200 | 300 | 400 | 480 |
| Copolymerization Condition (°C., min.) | 260,50 | 260,60 | 260,80 | 260,100 |
| Dicyclopentadiene/Indene (parts/parts) | 90.7/9.3 | 84.9/15.1 | 78.3/21.7 | 72.3/27.7 |
| Yield (%) | 50 | 55 | 65 | 65 |
| Softening Point (°C.) | 101 | 98 | 100 | 96 |
| Bromine Value | 105 | 92 | 85 | 76 |
| Hue (Gardner) | 5 | 7 | 10 | 11 |

Preparation of Copolymer Resin S-8 Used in Comparative Example 300 g of dicyclopentadiene 90% in purity, 200 g of vinyltoluene and 500 g of xylene were charged into a two liter volume autoclave and reacted at 260° C. for 2 hours in the nitrogen atmosphere to obtain a copolymer solution from which unreacted materials, oligomers and xylene were removed by distillation, whereby a copolymer resin S-8 was prepared. The yield was 82%, and the resin had a softening point of 100° C., a bromine value of 82 and a hue (Gardner) of 3.

Preparation of Copolymer Resin S-9 Used in Comparative Example

Into a two liter volume autoclave charged were 300 g of dicyclopentadiene 95% in purity and 700 g of a fractional distillate of cracked naphtha containing 40% of indene and 15% of monovinyl substituted aromatic compounds including vinyltoluene and β-methylstyrene and reacted at 260° C. for 2.5 hours in the nitrogen atmosphere to obtain a copolymer solution from which unreacted materials, oligomers and xylene were removed by distillation, whereby a resin S-9 was prepared at the yield of 67%. The resultant resin had a softening point of 95° C., a bromine value of 73 and a hue (Gardner) of 14. In preparation of this copolymer, about 100 parts by weight of indene was copolymerized with 100 parts by weight of dicyclopentadiene, and the resultant resin is an example wherein the quantity of indene is in excess of the defined range.

Preparation of Resin S-10 Used in Comparative Example

The "Nisseki Neopolymer T" which is a commercially available petroleum resin of aromatic series produced and sold by Nippon Synthetic Resin Co., Ltd. was prepared for use as a resin S-10. The properties of the resin S-10 are shown in Table 3-2.

Preparation of Copolymer resin S-11 Used in Comparative Example

Similarly as in the preparation of the resin S-4, 500 parts of dicyclopentadiene 95% in purity was reacted with 500 parts of a fractional distillate of cracked naphtha containing 45% of vinyltoluene and α-methylstyrene and less than 4% of indene at 260° C. for 2 hours in the nitrogen atmosphere to obtain a copolymer solution from which unreacted materials, oligomers and xylene were removed by distillation, whereby a resin S-11 having a softening point of 100° C., a bromine value of 70 and a hue (Gardner) of 10 was prepared.

This resin is an example containing a large amount of styrene derivatives such as vinyltoluene and only little indene.

Hydrogenation of the Resins S-1 to S-11

The copolymer resins S-1 to S-7 for use in the Examples of the invention and the resins S-8 to S-11 for use in the Comparative Examples were hydrogenated to hydrogenate the aromatic rings. The reaction conditions and the properties of the resultant hydrogenated resins are shown in Table 3-1 and 3-2.

100 g of each of the resins S-1 to S-11, 100 g of methylcyclohexane as a solvent and 3 g of the catalyst identified in Tables 3-1 and 3-2 were put into a 500 ml volume autoclave provided with a stirrer and effected hydrogenation. The reaction mixture was recovered after cooling, filtered and then the solvent was removed by distillation to obtain a hydrogenated resin, respectively.

The catalyst A identified in Tables 3-1 and 3-2 is a nickel-diatomaceous earth catalyst (Stabilized Nickel N-103A produced by Nikki Chemicals Co., Ltd.) and the catalyst B is a palladium-carbon catalyst (Pd Content: 10%).

TABLE 3-1

Hydrogenated Resin of the Invention

| | | HS-1 | HS-2 | HS-3 | HS-4 | HS-5 | HS-6 | HS-7 |
|---|---|---|---|---|---|---|---|---|
| | Hydrogenated Resin | HS-1 | HS-2 | HS-3 | HS-4 | HS-5 | HS-6 | HS-7 |
| | Copolymer Resin | S-1 | S-2 | S-3 | S-4 | S-5 | S-6 | S-7 |
| | Hydrogenation Catalyst | A | A | B | A | A | A | B |
| Condition of Hydrogenation | Temperature (°C.) | 260 | 260 | 280 | 260 | 260 | 260 | 260 |
| | Reaction Time (hr.) | 1.5 | 3 | 5 | 1.5 | 2 | 2.5 | 2 |
| | Pressure of $H_2$ (kg/cm²) | 100 | 100 | 100 | 100 | 100 | 100 | 100 |
| Properties of Resin | Softening Point (°C.) | 103 | 101 | 100 | 98 | 96 | 98 | 98 |
| | Bromine Value | 2.5 | 3.0 | 3.0 | 2.0 | 2.5 | 4.0 | 5.0 |
| | Hue (Gardner) | Below 1 | Below 1 | Below 1 | Below 1 | Below 1 | Below 1 | Below 1 |
| | Hydrogenation Percentage (%) | 60 | 70 | 70 | 75 | 70 | 65 | 60 |

TABLE 3-2

Hydrogenation Resin of Comparative Example

| | | HS-8 | HS-9 | HS-10 | HS-11 | HS-6'* | HS-6"* |
|---|---|---|---|---|---|---|---|
| | Hydrogenated Resin | HS-8 | HS-9 | HS-10 | HS-11 | HS-6'* | HS-6"* |
| | Copolymer Resin | S-8 | S-9 | S-10 | S-11 | S-6 | S-6 |
| | Hydrogenation Catalyst | A | B | A | B | B | A |
| Condition of Hydrogenation | Temperature (°C.) | 260 | 260 | 280 | 260 | 260 | 280 |
| | Reaction Time (hr.) | 4 | 4 | 6 | 2 | 0.25 | 7 |
| | Pressure of $H_2$ (kg/cm²) | 100 | 100 | 100 | 100 | 100 | 100 |
| Properties of Resin | Softening Point (°C.) | 99 | 93 | 101 | 97 | 100 | 94 |
| | Bromine Value | 3.0 | 6.5 | 4 | 5.0 | 30 | 0.5 |
| | Hue (Gardner) | Below 1 | Below 1 | Below 1 | Below 1 | 2 | Below 1 |
| | Hydrogenation Percentage (%) | 70 | 70 | 70 | 60 | 8 | 98 |

*Note:
The hydrogenated resins HS' and HS" were produced from the copolymer resin S-6 and differentiated in the hydrogenation percentage to be out of the range as defined in the present invention.

Examples and Comparative Examples
(Preparation and Properties of Adhesives)

A hot melt composition was prepared by melting and uniformly mixing 40 parts of each of the hydrogenated resins HS-1 to HS-11 and HS-6' and HS-6" as set forth in Tables 3-1 and 3-2, 40 parts of an ethylene-vinyl acetate copolymer produced and sold by Nippon Oil Company Limited under the Trade Name of "EVA-FLEX 220" and 20 parts of 145° F. paraffin wax (available from Nippon Oil Company Limited). 5 grams of the resultant composition was molded in an aluminum foil of 150×200 mm in demensions and 0.2 mm in thickness at 180° C. for 3 minutes under a pressure of 150 kg/cm²G to form a test specimen of 0.2 mm in thickness and 25 mm in width which was subjected to peeling test generally in accordance with the ASTM D1876-61T method to determine the peeling strength, respectively. 3 grams of each of the hydrogenated resins and seven grams of 145° F. paraffin wax were put into a test tube, melted, mixed together and then allowed to stand for cooling to find out the temperature at which a portion of the mixture became cloudy, said temperature being determined as the cloud point of each of the hydrogenated resins with the 145° F. paraffin wax. The results are shown in Table 4-1 and 4-2.

TABLE 4-1

Examples of the Invention

| Specimen No. | 1 | 2 | 3 | 4 | 5 | 6 | 7 |
|---|---|---|---|---|---|---|---|
| Hydrogenated Resin | HS-1 | HS-2 | HS-3 | HS-4 | HS-5 | HS-6 | HS-7 |
| Peeling Strength (g/25mm) | 2,000 | 2,200 | 2,050 | 2,200 | 2,450 | 2,100 | 2,000 |
| Cloud Point with Wax (°C.) | 66 | 67 | 68 | 66 | 67 | 68 | 68 |

TABLE 4-2

Comparative Examples

| Specimen No. | 8 | 9 | 10 | 11 | 12 | 13 |
|---|---|---|---|---|---|---|
| Hydrogenated Resin | HS-8 | HS-9 | HS-10 | HS-11 | HS-6' | HS-6" |
| Peeling Strength (g/25mm) | 1,350 | 1,400 | 1,100 | 1,350 | 1,600 | 1,000 |
| Cloud Point (°C.) | Get cloud | 70 | 70 | Get cloud | 75 | 66 |

As will be apparent from Tables 4-1 and 4-2, the compositions according to the present invention (Specimen Nos. 1 to 7) have satisfactory peeling strengths and acceptable hues. Further, the cloud points of the compositions of the invention are low when mixed with waxes, which shows that the resins and the waxes are intimately miscible to form excellent adhesive compositions. On the contrary, the comparative examples (Specimen Nos. 8 to 11) are far deteriorated in that they are weak in peeling strengths and the cloud points thereof with waxes are high. The comparative example (Specimen No. 12) using a resin the hydrogenation ratio of which is short of the defined range is objectionable in that the cloud point thereof is high and unsatisfactory in peeling strength and hue. On the other hand, the comparative example (Specimen No. 13) using a resin the hydrogenation percentage of which is in excess of the defined range has unsatisfactory peeling strength.

Figure 1:
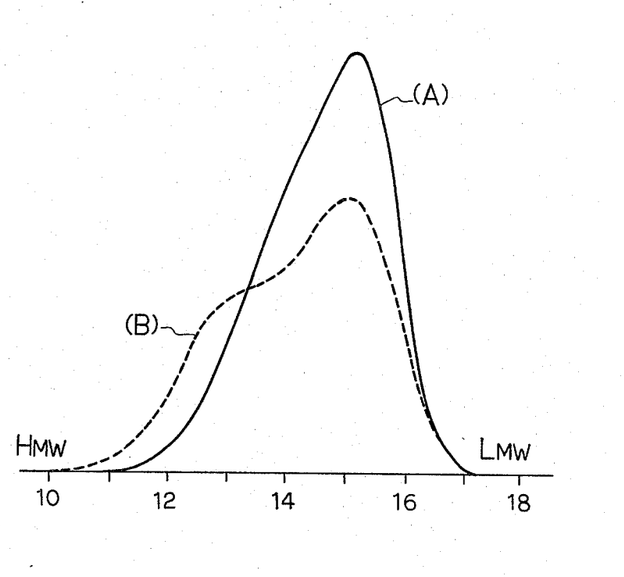
The single drawing is a graph showing the molecular weight distribution of one example of the hydrogenated resin according to the present invention in comparison with that of one comparative example determined by Gel permeation chromatography.

In order to clarify the differences between the hydrogenated resin HS-2 used in the present invention and the hydrogenated resin HS-11 used in the comparative example, the molecular weight distributions of both resins are determined by Gel permeation chromatography and shown in the appended drawing.

In the drawing, the real line A shows molecular weight distribution of the resin HS-2, whereas the dotted line B shows that of the resin HS-11. As will be clear from the drawing, the resin HS-11 prepared from dicyclopentadiene and styrene derivatives contains a relatively large amount of high molecular weight polymers and the molecular weights thereof are distributed in a wider range as compared to the resin HS-2 prepared from dicyclopentadiene and indene according to the present invention. In our consideration, this is the main cause for the poor miscibility with waxes and the unsatisfactory peeling strength of the resultant adhesives of the comparative examples.

Preparation of Copolymer Resins S-12 to S-15 Used in Examples

Into two liter volume autoclave charged were dicyclopentadiene (DCPD), indene, allyl alcohol and xylene at the ratio as set forth in Table 5 and reacted in the nitrogen atmosphere under the copolymerization conditions as set forth in Table 5 to obtain a copolymer solution from which unreacted materials, oligomers and xylene were removed by distillation to prepare each of the dicyclopentadiene copolymer resins S-12, S-13, S-14 and S-15 having the properties as set forth also in Table 5.

TABLE 5

|  |  | Copolymer Resin | | | |
|---|---|---|---|---|---|
|  |  | S-12 | S-13 | S-14 | S-15 |
| Materials Charged | DCPD (parts) | 560(100)* | 573(100)* | 524(100)* | 492(100)* |
|  | Indene (parts) | 90(16.1)* | 91(15.9)* | 130(24.8)* | 181(36.8)* |
|  | Allyl Alcohol (parts) | 50(8.9)* | 36(6.3)* | 46(8.8)* | 27(5.5)* |
|  | xylene (parts) | 300 | 300 | 300 | 300 |
|  |  | Copolymerization Condition (°C., min.) | | | |
|  |  | 270,70 | 270,60 | 270,65 | 270,85 |
| Property of the Resultant Polymer | Softening Point (°C.) | 91 | 92 | 95 | 97 |
|  | Bromine Value | 90 | 92 | 83 | 76 |
|  | Hydroxyl Value | 66 | 47 | 55 | 37 |
|  | Hue (Gardner) | 8 | 8 | 10 | 11 |

*Note:
The values in parentheses are those calculated to show the quantities relative to 100 parts of dicyclopentadiene.

Preparation of Copolymer Resins S-16 to S-18 Used in Examples

Into a two liter volume autoclave charged were dicyclopentadiene (DCPD), a fractional distillate of cracked naphtha containing 37% of indene (and further containing as impurities 12% of monovinyl substituted aromatic compounds including vinyltoluene and β-methylstyrene and the balance of other hydrocarbons), allyl alcohol and xylene at the ratio as set forth in Table 6 and reacted in the nitrogen atmosphere under the copolymerization conditions as set forth in Table 6 to obtain a copolymer solution from which unreacted materials, oligomers and xylene were removed by distillation to prepare each of the dicyclopentadiene copolymer resins S-16, S-17 and S-18 having the properties as set forth also in Table 6.

TABLE 6

|  |  | Copolymer Resin | | |
|---|---|---|---|---|
|  |  | S-16 | S-17 | S-18 |
| Materials Charged | DCPD (parts) | 604(100)* | 527(100)* | 485(100)* |
|  | Fractional Distillate of Cracked Naphtha (parts) | 151(9.3)* | 226(15.9)* | 485(37.0)* |
|  | Allyl Alcohol (parts) | 45(7.5)* | 47(8.9)* | 30(6.2)* |
|  | Xylene (parts) | 200 | 200 | — |
|  |  | Copolymerization Condition (°C., min.) | | |
|  |  | 160,75 | 260,65 | 260,85 |
| Property of the Resultant Polymer | Softening Point (°C.) | 90 | 91 | 96 |
|  | Bromine Value | 95 | 90 | 76 |
|  | Hydroxyl Value | 55 | 65 | 48 |
|  | Hue (Gardner) | 10 | 9 | 11 |

Note:
The values in parentheses show the quantities of indene and allyl alcohol relative to 100 parts of dicyclopentadiene.

Preparation of Copolymer Resin S-19 Used in Example 375 parts of dicyclopentadiene, 45 parts of indene and 580 parts of xylene were charged into a two liter volume autoclave and reacted at 250° C. for 4 hours in the nitrogen atmosphere to obtain a copolymer solution from which unreacted materials, oligomers and xylene were removed by distillation to prepare a resin S-19 having a softening point of 101° C., a bromine value of 98 and a hue (Gardner) of 4.

Preparation of Resin S-20 Used in Comparative Example 638 parts of dicyclopentadiene, 126 parts of allyl alcohol and 300 parts of xylene were charged in a two liter volume autoclave and reacted at 260° C. for 2 hours in nitrogen atmosphere to obtain a copolymer solution from which unreacted materials, oligomers and xylene were removed by distillation to prepare a resin S-20 having a softening point of 98° C., a bromine value of 91, a hydroxyl value of 208 and a hue (Gardner) of 11.

Preparation of Resins S-21 and S-22 Used in Comparative Examples

Into a two liter volume autoclave charged were dicyclopentadiene (DCPD), indene, allyl alcohol and xylene at the ratio as set forth in Table 7 and reacted in the nitrogen atmosphere to obtain a copolymer solution from which unreacted materials, oligomers and xylene were removed by distillation to prepare each of the dicyclopentadiene copolymer resins S-21 and S-22 as set forth in Table 7.

TABLE 7

| Copolymer Resin | | S-21 | S-22 |
|---|---|---|---|
| Materials Charged | DCPD (parts) | 305 (100)* | 134 (100)* |
| | Indene (parts) | 150 (49)* | 134 (100)* |
| | Allyl Alcohol (parts) | 90 (29.5)* | 13 (9.7)* |
| | Xylene (parts) | 300 | 300 |
| Copolymerization Condition (°C., min.) | | 270,130 | 270,200 |
| Property of the Resultant Polymer | Softening Point (°C.) | 99 | 95 |
| | Bromine Value | 72 | 55 |
| | Hydroxyl Value | 195 | 75 |
| | Hue (Gardner) | 12 | 15 |

Note:
The values in parentheses show the quantities of indene and allyl alcohol relative to 100 parts of dicyclopentadiene.

Hydrogenation of the Resins S-12 to S-22

Each of the resins S-12 to S-22 prepared as above was hydrogenated generally following to the procedure described below. The reaction conditions and the properties of the resultant hydrogenated resins are shown in Table 8.

100 g of each of the resins S-12 to S-22, 75 g of methylcyclohexane, 25 g of n-butanol and 3 g of the catalyst identified in Table 8 were put into a 500 ml volume autoclave provided with a stirrer and effected hydrogenation. The reaction mixture was recovered after cooling, filtered and then the solvent was removed by distillation to obtain a hydrogenated resin, respectively. The catalyst A is a nickel-diatomaceous earth catalyst (Stabilized Nickel Catalyst N-103A produced by Nikki Chemicals Co., Ltd.) and the catalyst B is Raney nickel catalyst.

TABLE 8

| | | Present Invention | | | | | | | |
|---|---|---|---|---|---|---|---|---|---|
| Hydrogenated Resin | | HS-12 | HS-13 | HS-14 | HS-15 | HS-16 | HS-17 | HS-18 | HS-19 |
| Copolymer Resin | | S-12 | S-13 | S-14 | S-15 | S-16 | S-17 | S-18 | S-19 |
| Hydrogenation Catalyst B | | B | A | A | B | B | A | A | |
| Condition of Hydrogenation | Temperature (°C.) | 180 | 180 | 230 | 230 | 180 | 180 | 230 | 260 |
| | Reaction Time (hr.) | 3 | 3 | 4 | 5 | 3 | 3 | 3 | 2 |
| | Pressure of $H_2$ (kg/cm$^2$) | 70 | 70 | 100 | 100 | 70 | 70 | 100 | 100 |
| Properties of the Resultant Resin | Softening Point (°C.) | 99 | 99 | 102 | 103 | 100 | 101 | 100 | 100 |
| | Bromine Value | 7 | 6 | 8 | 7 | 7 | 6 | 7 | 2.5 |
| | Hydroxyl Value | 67 | 48 | 54 | 37 | 56 | 66 | 47 | 0 |
| | Hue (Gardner) | 1 | Below 1 | 1 | 1 | Below 1 | Below 1 | 1 | Below 1 |
| | Hydrogenation Percentage (%) | 70 | 65 | 60 | 60 | 70 | 65 | 60 | 65 |

| | | Comparative Example | | | | |
|---|---|---|---|---|---|---|
| Hydrogenated Resin | | HS-20 | HS-21 | HS-22 | HS-15'* | HS-15''* |
| Copolymer Resin | | S-20 | S-21 | S-22 | S-15 | S-15 |
| Hydrogenation Catalyst | | B | B | A | A | A |
| Condition of Hydrogenation | Temperature (°C.) | 180 | 180 | 230 | 180 | 260 |
| | Reaction Time (hr.) | 2 | 4 | 3 | 3 | 5 |
| | Pressure of $H_2$ (kg/cm$^2$) | 70 | 70 | 100 | 100 | 100 |
| Properties of the Resultant Resin | Softening Point (°C.) | 98 | 102 | 97 | 97 | 92 |
| | Bromine Value | 18 | 28 | 22 | 52 | 1 |
| | Hydroxyl Value | 130 | 190 | 73 | 37 | 31 |
| | Hue (Gardner) | 4 | 4 | 3 | 8 | Below 1 |
| | Hydrogenation Percentage (%) | — | 45 | 30 | 5 | 95 |

*Note:
The hydrogenated resin HS-15' and HS-15" to used in Comparative Examples were produced from the copolymer resin S-15 and differentiated in the hydrogenation percentage to be out of the range defined in the present invention.

Examples and Comparative Examples
(Preparation and Properties of Adhesives)

A hot melt composition was prepared by melting and uniformly mixing 40 parts of each of the hydrogenated resins HS-12 to HS-22 and HS-15' and HS-15", 40 parts of "EVAFLEX 220" (Ethylene-vinylacetate copolymer) and 20 parts of 145° F. paraffin wax, respectively. 5 grams of the resultant composition was molded in an aluminum foil of 150×200 mm in dimensions and 0.2 mm in thickness at 180° C. for 3 minutes under a pressure of 150 kg/cm$^2$G to form a test specimen of 0.2 mm in thickness and 25 mm in width which was subjected to peeling test generally in accordance with the ASTM D1876-61T method to determine the peeling strength of Al/Al. Similarly, the peeling strength of polyester/polyester was determined. 3 grams of each of the resins and 7 grams of 145° F. paraffin wax were put into a test tube, melted, mixed together and then allowed to stand for cooling to find out the temperature at which a portion of the mixture became cloudy, said temperature being determined as the cloud point of the hydrogenated resin with the 145° F. paraffin wax. The results are shown in Table 9.

TABLE 9

| | Example of the Invention | | | | | | | | Comparative Example | | | | | |
|---|---|---|---|---|---|---|---|---|---|---|---|---|---|---|
| Specimen No. | 12 | 13 | 14 | 15 | 16 | 17 | 18 | 19 | 20 | 21 | 22 | 23 | 24 | 25* |
| Hydrogenated Resin | HS-12 | HS-13 | HS-14 | HS-15 | HS-16 | HS-17 | HS-18 | HS-19 | HS-20 | HS-21 | HS-22 | HS-15' | HS-15" | |
| Al/Al Peeling Strength (g/25mm) | 3200 | 3900 | 3000 | 2800 | 3950 | 3200 | 2800 | 2000 | 1400 | 1300 | 1550 | 1600 | 1800 | 3000 |
| Polyester/Polyester Peeling Strength | 2850 | 3200 | 2500 | 2250 | 2400 | 2850 | 2200 | 200 | 1600 | 1600 | 250 | 1200 | 1800 | 2200 |
| Cloud Point with Wax (°C.) | 67 | 67 | 67 | 68 | 67 | 67 | 69 | 68 | 130 | 125 | 78 | 95 | 67 | 67 |
| Remarks | | | | | | | | | | Objected Hue | | Objected in Hue & Heat Resistance | | |

*Note:
Specimen No. 25 was prepared from a hydrogenated rosin ester.

As will be clear from Table 9, the adhesives according to the present invention (Specimen Nos. 12 to 18) have satisfactory peeling strengths and acceptable hues. Further, the cloud points are low when mixed with waxes, which shows that the resins and waxes are intimately miscible to form excellent adhesives. The adhesive according to the invention which does not contain allyl alcohol (Specimen No. 19) is good in the Al/Al peeling strength. The adhesives according to the invention containing allyl alcohol show further increased polyester/polyester peeling strength.

The adhesive of Specimen No. 20 (comparative example) which does not contain indene is appreciably inferior in adhesive property as compared to the adhesives according to the invention. The adhesive of Specimen No. 21 which contains an excess amount of allyl alcohol is inferior in miscibility and hue and the peeling strength thereof is also unsatisfactory. The adhesive of Specimen No. 22 which contains an excess amount of indene is unsatisfactory in peeling strength, and particularly the peeling strength thereof when applied on a polyester is low. The adhesive of Specimen No. 23 which has not sufficiently been hydrogenated, i.e. the hydrogenation percentage being smaller than the defined range, is considerably objectionable in hue and the stability against heat and the peeling strength thereof are also unsatisfactory due to its high bromine value. Finally, the adhesive of Specimen No. 24 having the aromatic rings almost fully hydrogenated is good in hue but the peeling strength thereof is unsatisfactory.

While the present invention has been described with reference to the specific examples, it should be understood that the invention is not restricted to such examples, but any change and modification may be made within the spirit and scope of the present invention as recited in the appended claims.

What is claimed is:

1. A hot melt composition comprising:
   (A) a hydrogenated resin having a softening point ranging from 60° to 130° C., said hydrogenated resin (A) being prepared by hydrogenating a resin at a hydrogenation percentage of aromatic rings of from 10 to 90%, said resin being prepare by copolymerizing at least two components comprising (a) 100 parts by weight of cyclopentadiene or its derivative selected from the group consisting of cyclopentadiene and dicyclopentadiene and an alkyl substituent thereof and (b) 5 to 50 parts by weight of indene or its derivative selected from the group consisting of indene and an alkyl substituent thereof; and
   (B) one or more compount selected from the group consisting of ethylene-unsaturated ester copolymers, polyester resins and waxes.

2. A hot melt composition according to claim 1, wherein said resin is prepared by copolymerizing (a) 100 parts by weight of the cyclopentadiene or its derivative, (b) 5 to 50 parts by weight of the indene or its derivative and (c) 3 to 10 parts by weight of allyl alcohol and wherein said hydrogenated resin (A) has a softening point ranging from 60° C. to 130° C. and a hydroxyl value of 30 to 120.

3. A hot melt composition according to claim 1, wherein said resin is prepared by copolymerizing at least two components comprising (a) 70 to 95 parts by weight of said cyclopentadiene or its derivative and (b) 5 to 30 parts by weight of said indene or its derivative.

4. A hot melt composition according to claim 1, 2 or 3 wherein as said indene or its derivative there is used a hydrocarbon mixture containing 35% or more of indene prepared by fractional distillation of the by-product C9-fraction of cracked naphtha.

5. A hot melt composition according to claim 1, 2 or 3 wherein said resin is prepared by heat copolymerizing at a temperature of from 200° C. to 300° C. for 30 minutes to 10 hours in the presence or absence of a solvent.

6. A hot melt composition according to claim 1, wherein said hot melt composition comprises (A) the hydrogenated resin having a bromine value of not more than 40 and (B) the one or more compound selected from the group consisting of ethylene-unsaturated ester copolymers, polyester resins and waxes.

7. A hot melt composition according to claim 6, wherein the hydrogenated resin (A) is prepared by subjecting to hydrogenation at a temperature of from 0° C. to 350° C. under a hydrogen pressure of from ambient pressure to 200 kg/cm$^2$.G.

8. A hot melt composition according to claim 6, wherein said ethylene-unsaturated ester copolymer is selected from the group consisting of vinyl acetate and an ester of acrylic acid or methacrylic acid with alcohols having 2 to 4 carbon atoms.

9. A hot melt composition according to claim 6, wherein said polyester resins have average molecular weights ranging from 500 to 50,000 and are selected from polyesters made from difunctional or polyfunctional carboxylic acids having 4 to 20 carbon atoms and dihydric or polyhydric alcohols having 2 to 20 carbon atoms.

10. A hot melt composition according to claim 6, wherein said waxes are selected from those originated from petroleum waxes, natural waxes, polyethylene waxes and polypropylene waxes.

11. A hot melt composition according to claim 6, wherein 100 parts by weight of one or more of said ethylene-unsaturated ester copolymers and/or one or more of said polyester resins are blended with 20 to 300 parts by weight of said hydrogenated resin (A) and 0 to 500 parts by weight of one or more of said waxes.

12. A hot melt composition according to claim 12, further comprising 0 to 5 parts by weight of filler, 0 to 5 parts by weight of an antioxidant, 0 to 20 parts by weight of a plasticizer and 0 to 10 parts by weight of a pigment.

* * * * *